United States Patent [19]

Yan

[11] Patent Number: 4,464,345

[45] Date of Patent: Aug. 7, 1984

[54] METHOD OF PRECIPITATING CONTAMINANTS IN A URANIUM LEACHATE USING FERRI IONS, COMPLEXING AGENT, AND PH CONTROL

[75] Inventor: Tsoung-Yuan Yan, Philadelphia, Pa.

[73] Assignee: Mobil Oil Corporation, New York, N.Y.

[21] Appl. No.: 452,164

[22] Filed: Dec. 22, 1982

[51] Int. Cl.$^3$ .................. C01G 43/00; C01G 39/00; C01B 33/113

[52] U.S. Cl. .................................. 423/7; 423/15; 423/17; 423/18; 423/58; 299/4

[58] Field of Search .............. 423/7, 15, 17, 18, 58; 299/4

[56] References Cited

U.S. PATENT DOCUMENTS

| | | | |
|---|---|---|---|
| 1,292,559 | 1/1919 | Andersen et al. | 423/58 |
| 2,800,387 | 7/1957 | Kimball et al. | 423/15 |
| 3,105,734 | 10/1963 | Hart | 423/17 |
| 3,288,570 | 11/1966 | Henrickson | 423/17 X |
| 3,790,658 | 2/1974 | Fox et al. | 423/15 |
| 4,222,872 | 9/1980 | Ramirez | 423/58 X |
| 4,273,745 | 6/1981 | Laferty et al. | 423/58 X |
| 4,304,757 | 12/1981 | Kuehl et al. | 423/15 |
| 4,366,126 | 12/1982 | Gardner | 423/17 X |

FOREIGN PATENT DOCUMENTS 115274  6/1918  United Kingdom ........... 423/58

*Primary Examiner*—Deborah L. Kyle
*Assistant Examiner*—Matthew A. Thexton
*Attorney, Agent, or Firm*—Alexander J. McKillop; Michael G. Gilman; Charles A. Malone

[57] ABSTRACT

The present invention relates to a process for recovery of uranium from a carbonate lixiviant additionally containing other contaminants such as molybdenum and silica, by adjusting the pH of the lixiviant to a value of at least 4 and treating the lixiviant to obtain a carbonate concentration of at least 50 ppm by weight. Subsequently the lixiviant is treated with an aqueous solution containing a sufficient amount of ferric iron to precipitate the contaminants without substantial precipitation with the uranium values. The precipitate is separated from the lixiviant. The treated lixiviant is passed through an ion exchange to retain uranium values.

22 Claims, No Drawings

METHOD OF PRECIPITATING CONTAMINANTS IN A URANIUM LEACHATE USING FERRI IONS, COMPLEXING AGENT, AND PH CONTROL

FIELD OF THE INVENTION

This invention relates to the recovery of uranium values and more particularly to the removal of contaminants such as molybdenum and silica from the leachate of a uranium leaching process to alleviate ion exchange resin poisoning.

BACKGROUND OF THE INVENTION

Uranium is produced from uranium-bearing ores by various procedures which employ a carbonate or acid lixiviant to leach the uranium from its accompanying gangue material. The acid lixiviants usually are formulated with sulfuric acid which solubalizes uranium as complex uranyl sulfate anions. The sulfuric acid normally is used in a concentration to maintain a pH between about 0.5 to 2.0. However, mild acidic solutions such as carbonic acid solutions, having a pH between about 5.0 and 7.0 may also be employed. Carbonate lixiviants contain carbonates, bicarbonates or mixtures thereof which function to complex the uranium in the form of water-soluble uranyl carbonate ions. The carbonate lixiviants may be formulated by the addition of alkali metal carbonates and/or bicarbonates or by the addition of carbon dioxide either alone or with an alkyline agent such as ammonia or sodium hydroxide in order to control the pH. The pH of the carbonate lixiviants may range from about 5 to about 10. The carbonate lixiviants may also contain a sulfate leaching agent. The lixiviant also contains a suitable oxidizing agent such as oxygen or hydrogen peroxide.

The leaching operation may be carried out in conjunction with surface milling operations wherein uranium ore obtained by mining is crushed and blended prior to leaching, heap leaching of all piles at the surface of the earth, or in-situ leaching wherein the lixiviant is introduced into a subterranean ore deposit and then withdrawn to the surface. Regardless of the leaching operation employed, the pregnant lixiviant is then treated in order to recover the uranium therefrom. One conventional uranium recovery process involves passing the pregnant lixiviant through an anionic ion exchange resin and elution of the resin with a suitable eluant to desorb the uranium from the resin. The resulting concentrated eluate is then treated to recover the uranium values, for example, by precipitating uranium therefrom to produce the familiar yellowcake.

The anionic ion exchange resins employed for uranium concentration are characterized by fixed cationic adsorption sites in which the mobile anion, typically chloride or another halide, hydroxide, carbonate or bicarbonate, is exchanged by the uranyl complex anion. Such anionic ion exchange resins are disclosed, for example, in Merritt, R. C., THE EXTRACTIVE METALLURGY OF URANIUM, Colorado School of Mines Research Institute, 1971, pp. 138-147, which are hereby incorporated by reference. Suitable anionic ion exchange resins may take the form of polymers or copolymers of styrene substituted with quaternary ammonium groups or polymers or copolymers of pyridine which are quaternized to form pyridinium groups.

In many areas where a leach operation, such as described above, is applicable, contaminants such as molybdenum values are also present in the ore. Since the molybdenum content in the leachate is generally the highest among the impurities, much of the efforts have been directed to the removal of molybdenum from process streams. The molybdenum will react similarly to the uranium in that the molybdenum values will oxidize and will leach into the solution along with the uranium. Likewise, the molybdenum values will be adsorbed onto the ion-exchange column and are eluted from the resin with the uranium values by the eluant. When the pregnant eluate is subjected to steam stripping, a portion of the molybdenum values, e.g., molybdic acid, will co-precipitate with the uranium values and is considered an undesirable contaminant in the yellowcake. If the molybdenum content in the yellowcake exceeds a specified value, e.g., 0.6 percent by weight, the yellowcake may require further extensive processing before it will be accepted by a commercial refiner.

It is also recognized that the presence of molybdenum in the pregnant lixiviant tends to reduce adsorption of uranium by the anionic ion exchange resin. Merritt discloses at pages 154, 163, and 164 that the presence of molybdenum in the pregnant lixiviant tends to poison the ion exchange resin, thus reducing the adsorption of uranium by the resin which results in decreased resin loading. Accordingly, the need for reducing the amount of molybdenum in the pregnant leachate prior to passing the leachate over an ion exchange resin is readily apparent.

A number of chemical or procedural techniques have been described to remove or at least decrease the molybdenum content of various process liquors. One technique teaches the addition of $Na_2S$ or NaHS to precipitate molybdenum and other heavy metals. However, the sulfides will also be consumed in reduction reactions with these other metals. Excess sulfide ion will cause incomplete precipitation and may also be adsorbed by ion exchange resin and then decomposed to form elemental sulfur.

Another technique for molybdenum removal is co-precipitation of molybdenum and ferric ion by partial neutralization of the acidic leachate with lime. The effectiveness of the technique is profoundly affected by the solution pH. As the pH increases, the molybdenum removal improved. However, the uranium loss, either occluded or co-precipitated with the iron/molybdenum product, increases to prohibitive levels above pH 3.4. When the pH of the leachate from a uranium leaching process is between 6 and 8, it would be impractical to adjust the pH to below 3.4 by use of acid due to several factors such as the cost of acid, the possible loss of carbonate, corrosion of the equipment, and contamination of the circuit with more ions. Thus it seems that to obtain improved molybdenum precipitation by increasing the pH, i.e., above 3.4, prohibitive loss of uranium values must be accepted.

Additionally, the presence of silica along with molybdenum in the rather reducing condition seems to yield silica polymolybdate which is strongly distributed along the outer shell of the ion exchange resin. Attempts to satisfactorily regenerate such poisoned resin have failed. For example, upon regeneration with HCl solution, the resins turned into deep blue typical of silicomolybdate blue. While not wishing to be bound by the above chemical theorization, it is clear that it is desirable to remove both silica and molybdenum from the process stream. Of course, it is also desirable to remove any other contaminant ions if possible to reduce the ionic concentration of the leaching circuit.

SUMMARY OF THE INVENTION

Accordingly, the present invention provides a process for the recovery of the uranium from a leachate which contains other mineral values such as molybdenum and silica. The leachate solution is treated so that the solution contains at least 50 ppm by weight, preferably 500 ppm carbonate, and has a pH value of at least 4 preferably of at least 5. The leachate is subsequently treated with an aqueous solution containing a sufficient amount of ferric iron to cause the substantial precipitation of the other mineral values such as molybdenum and silica but without substantial precipitation of uranium values. The leachate solution is then separated from the precipitate and passed through an ion exchange resin column to cause the resin to retain uranium values. When the resin column is loaded with uranium values, the uranium values may be recovered by eluting the resin in accordance with known processes such as the treatment with hydrochloric acid.

The precipitate may be treated with a mild carbonate solution having a pH value between about 5 to about 8 to recover any uranium values that may have been precipitated with the molybdenum values. Additionally, when the other mineral values are present in sufficient amounts to allow economic recovery, the precipitate is treated to recover such mineral values. For example, when molybdenum is the other mineral value, the precipitate may be additionally treated with a caustic solution having a pH value of at least 8.5 to recover molybdenum values therefrom.

The present invention is particularly applicable for the treatment of a uranium leachate wherein molybdenum and silica values are additionally present. Furthermore, the present invention may be utilized in either surface or in-situ uranium leaching operations.

DETAILED DESCRIPTION OF THE INVENTION

In the following description and examples, the invention will be described in connection with the recovery of uranium values from a lixiviant additionally containing molybdenum and/or silica values. However, it should be clear that the invention is applicable to the recovery of uranium from lixiviants containing other minerals that when treated with a ferric iron solution under the conditions of the present invention form a precipitate. For example, other minerals found in the uranium lixiviant include copper, nickel, selenium, thorium, scandium, arsenic, boron, chromium, ion, vanadium, floride and sulfur.

The present invention may be applied in in-situ mining operations as well as surface recovery processes. The surface recovery processes are well known. Basically, the mined uranium-containing ore is introduced into holding tanks wherein the ore is subjected to leaching operations. Conventionally, in in-situ solution mining processes, the leaching solution is brought into contact with the subterranean deposit by injection into one or more injection wells which penetrate the deposit. The leaching solution is introduced into the injection well under sufficient pressure to force it out of the well-bore into the adjacent deposit. Continued injection of leaching solution drives the solution through the deposit to one or more spaced-apart production wells where the solution is recovered for subsequent extraction of the mineral values. The number of injection and production wells and the spacing in-between can vary depending upon the nature of the formation. Additionally, the pattern of injection and production wells can also vary although a typical pattern is the five spot pattern consisting of a centrally disposed recovery well and four injection wells spaced around the recovery well. Alternatively, a given volume of leaching solution can be injected into a well to percolate in the surrounding formation. Following the injection phase, the well is pumped out and the injected leaching solution is recovered from the same well into which it had been injected.

The in-situ leaching operations are most efficient when a fairly uniform formation is the subject of the leaching process. All too often, however, and in fact in the majority of cases, the formations are not uniform as to both porosity and permeability. In some zones, the strata are sufficiently heterogeneous as to severely alter flow patterns. Leaching fluids follow the higher permeability streaks, thus bypassing portions of the ore body, which results in the loss of recoverable uranium due to the lack of contact by the leaching fluids. In many reservoirs, 30 to 50 weight percent or more of uranium ore values may not be recoverable via in-situ leaching because of channeling of leachate through the high permeability zones. Accordingly, in uranium formation exhibiting variations in permeability, the leaching fluids are injected into the formation and driven through the formation by means of aqueous driving solutions comprising viscosity builders or thickeners. Additionally, a thickening agent solution may be utilized as a blocking agent to divert the flow of the leaching solutions from the higher permeability zones of the formations. The use of such thickening agents solutions substantially reduces the fingering and channeling of the leaching solution thus increasing uranium recovery not by leaching action but through a provision of a more favorable mobility in the formation.

In the recovery of uranium values from uranium-bearing ores whether in surface operation or in-situ leaching operations, an oxidizing agent is utilized to contact the mineral deposit to oxidize the uranium from its insoluble tetravalent form to its soluble hexavalent form. Any of the conventionally used oxidizing agents can be employed as the oxidant in the aqueous leaching solution in accordance with the present invention. For example, potssium permanganate, potassium ferricyanide, sodium hypochlorite, potassium disulphate, and hydrogen peroxide can be employed. In addition, oxygen or oxygen-containing gases, such as air, can be dissolved in the leaching solution to provide the necessary oxidizing agent. Hydrogen peroxide, oxygen and oxygen-containing gases are preferred oxidizing agents. When a gaseous oxidant is utilized, the oxidization step may be carried out as a separate step.

A uranium-complexing agent is additionally required in the leaching solution to solublize even the hexavalent form of uranium. Any of the conventionally utilized uranium-complexing agents can be employed in the process in accordance with the present invention. The leaching solution can be either acidic or basic. Suitable uranium-complexing agents for use in the leaching solution in accordance with the present invention include but are not limited to, carbonates and/or bicarbonates such as alkyl metal carbonates and/or bicarbonates and ammonium carbonates and/or bicarbonates. Carbon dioxide dissolved in water forms a suitable uranium leaching or complexing solution. Additionally, mild carbonic acid solutions may be utilized to solubilize the uranium values. Strong acids such as hydrochloric, sulfuric and others have been utilized for the recovery of uranium values from uranium-containing ore. As stated before, the above represent mere examples of uranium-complexing agents as utilized in a leaching solution and are not intended as limitations on the present invention.

Whichever method is utilized to recover the uranium values from uranium-containing ore, be it by surface or in-situ leaching operations, the resultant is an aqueous leachate containing uranium values and other contaminant mineral values such as molybdenum and silica. As noted previously, the recovery of uranium from pregnant lixiviant involves the concentration of uranium employing an ion exchange resin and subsequent precipitation to recover the uranium as yellowcake. However, due to the presence of other contaminant mineral values such as molybdenum and silica in addition to the uranium values, the pregnant lixiviant is advantageously treated in accordance with the present invention prior to passing the pregnant lixiviant over an ion exchange resin to recover the uranium values therein.

Accordingly, the present invention provides a process for the selective precipitation of the other contaminant mineral values, particularly molybdenum and silica, without substantial precipitation or uranium values.

In accordance with the present invention, the pregnant lixiviant, containing uranium and molybdenum values, is treated with a ferric iron aqueous solution to cause essentially the complete percipitation of molybdenum values without substantial precipitation of uranium values. Uranium precipitation is minimized or essentially prevented by controlling the pH and carbonate and/or bicarbonate concentration in the lixiviant. Thus, if necessary, the pregnant lixiviant is treated in such a manner as to give it a pH value of at least 4 and preferably at least 5. Furthermore, the pregnant lixiviant is treated such that it has a carbonate and/or bicarbonate concentration of at least 50 ppm by weight preferably at least 500 ppm. The amount of carbonate and/or bicarbonate needed is dependent upon the amount of uranium present in the pregnant lixiviant. When a carbonate and/or bicarbonate leaching solution is originally utilized to recover the uranium values from the uranium-containing ore, then the produced leachate would probably be characterized by having a pH of at least 4, usually from about 5 to about 8, and a carbonate/bicarbonate concentration of at least 50 ppm. When other leaching solutions are utilized, adjustment of pH and addition of carbonates/bicarbonates may be required.

The pregnant lixiviant is subsequently treated with an aqueous solution of ferric ion. The ferric ion will cause the essentially complete precipitation of molybdenum values without the substantial precipitation of uranium values. While not wishing to be bound by any theory, it is believed that the presence of carbonates/bicarbonates stabilizes the uranium as a uranyl carbonate complex thus preventing hydration of the uranium values to hydroxides or oxides which are insoluble at these higher pH values. The higher pH values as required by the present invention, allow the more complete precipitation of molybdenum values.

The ferric ion solution may be obtained by the dissolution of any source of ferric ion such as ferric chloride and ferric sulfate. The aqueous ferric solution should contain sufficient ferric ion to cause essentially the complete precipitation of molybdenum values. However, the concentration of ferric ion in the solution should be above 50 ppm to minimize the dilution of the process stream. The amount of ferric ion required depends on the molybdenum content of the solution and other process conditions. It is preferably in the range of 0.1 to 5 grams of $Fe^{+++}$ per gram of molybdenum.

Upon adding the ferric solution, the leachate is passed through a holding tank to allow the precipitate to settle. The residence time required ranges from about 5 minutes to about 10 hours and is preferably within the range of 30 minutes to 2 hours. The residence time required also depends on the presence of other impurities. When silica is also present in addition to molybdenum as an impurity, silica may be removed in accordance with the present invention. Furthermore, the presence of silica in 20 to 100 ppm range, increases the settling rate of the precipitate by a factor of 2 to 3. Additionally, any means of separating the precipitate from the solution may be utilized.

The clean effluent solution is fed to the ion exchange for uranium recovery. The precipitate is washed with dilute bicarbonate solution having a pH from about 5 to about 8 to recover any traces of uranium present in the precipitate. The wash solution can be recycled and fed to the ion exchanges for uranium recovery or recycled along with the leaching solution. The washed precipitate can be treated with a caustic solution having a pH value of at least 8.5 to recover molybdenum values from the precipitate. The molybdenum leaching can be conducted in a column or a tank as a pulp. Furthermore, the leaching can be done in autoclaves at higher temperatures and pressures to facilitate resolution of molybdenum. The molybdenum rich solution is processed further for molybdenum recovery by conventional means. The residue which is mainly ferric hydroxide is redesolved in acid to produce ferric ion solution for reuse.

EXPERIMENTAL

Synthetic leachate Solution A was prepared as shown in Table 1. 0.025M ferric solution was prepared by dissolving ferric chloride in water (Solution B). The desired amount of Solution B was added to Solution A slowly with aggitation forming a brown precipitate. Sodium hydroxide was added simultaneously to keep the solution pH from getting lower than the set level. The agitation was continued for 30 minutes. The mixture was filtered using 0.45 mili-micron Milipore filter. The filtrate and some filtercakes were annalized for uranium and molybdenum. In Run 3, the filtercake was washed with 10 grams per liter of sodium bicarbonate. The results are shown in Table 2.

TABLE 1

Preparation of Test Solutions

Solution A
The following chemicals were added to make 1 of solution.

| Chemicals | | Ions, ppm | | | | | | |
|---|---|---|---|---|---|---|---|---|
| | | Na | Mo | Ca | $HCO_3$ | Cl | $SO_4$ | $SiO_2$ | U |
| 1. $Na_2MoO_4 \cdot 2H_2O$, | mg: 278 | 53 | 110 | | | | | | |

TABLE 1-continued

| Preparation of Test Solutions | | | | | | | | | |
|---|---|---|---|---|---|---|---|---|---|
| 2. CaO | mg: 168 | | 120 | | | | | | |
| 3. NaHCO$_3$ | mg: 868 | 248 | | 620 | | | | | |
| 4. NaCl | mg: 577 | 227 | | | 350 | | | | |
| 5. Na$_2$SO$_4$ | mg: 942 | 305 | | | | 637 | | | |
| 6. SiO$_2$ | mg: 40 | | | | | | 40 | | |
| 7. U | mg: | | | | | | | 50 | |
| | | 833 | 110 | 120 | 620 | 350 | 637 | 40 | 50 | pH was adjusted using HCl to 7.39
Mo and U$_3$O$_8$ content were found to be 114 and 46 ppm, respectively.
Solution B
0.025 M of ferric solution containing 1.77 mg of Fe/cc.
pH of the solution was adjusted to 2 with NaOH solution.
The Fe$^{++}$ content was found to be 1325 ppm by analysis.

TABLE 2

Coprecipitation of Mo with Fe

| Sample | Fe/Mo g/g | pH | Filtrate, ppm Mo | U$_3$O$_8$ | Mo removed/Fe, g/g |
|---|---|---|---|---|---|
| Feed | 0 | 7.4 | 114 | 50 | — |
| 1 | 0.11 | 7.2 | 110 | — | 0.30 |
| 2 | 0.23 | 7.2 | 105 | — | 0.34 |
| 3 | 0.46 | 7.2 | 95 | 44 | 0.36 |
| 4 | 0.93 | 7.1 | 85 | — | 0.27 |
| 5 | 1.86 | 7.2 | 75 | — | 0.25 |
| 6 | 2.79 | 7.2 | 55 | — | 0.19 |
| 7 | 0.93 | 6.7 | 75 | 28 | 0.37 |
| 8 | 1.86 | 6.5 | 55 | 18 | 0.37 |
| 9 | 2.79 | 6.6 | 30 | 17 | 0.26 |
| 10* | 0.93 | 6.5 | — | 36 | — |
| 11* | 1.86 | 6.6 | — | 31 | — |
| 12* | 2.79 | 6.5 | — | 18 | — |
| 13** | 0.11 | 6.2 | — | 29 | — |
| 14** | 0.23 | 4.2 | — | 37 | — |
| 15** | 0.35 | 3.5 | — | 45 | — |

*In these runs the HCO$_3$ concentration was increased from 620 to 1240 ppm.
**Initial pH of Solution A was adjusted from 7.4 to 10.

As can be seen from the tables, it was possible to reduce the molybdenum concentration from 114 ppm to 30 ppm at pH 6.6 which is compatible with the CO$_2$/O$_2$ leaching system. The maximum level of molybdenum which the ion exchange resins can tolerate is not known but it is estimated that 30 to 50 ppm could be satisfactory.

The molybdenum removal increased as the dosage of ferric ions or Fe/Mo ratio in the feed solution was increased (Table 2). At Fe/Mo ratio of 2.8 and pH 6.6, the molybdenum concentration in the filtrate was reduced from 114 to 30 ppm. The molybdenum removal was not exactly linear with Fe/Mo ratio. It is possible that ferric ions react with other species such as silica more preferentially, so that when the Fe/Mo ratio is low, relatively high proportion of ferric ions is consumed for such species. However, as Fe/Mo ratio increases to high levels of ferric excess, the molybdenum removal efficiency falls.

As the Fe/Mo ratio in the feed increases, the extent of molybdenum removal increases, but the loss of uranium also increases significantly (Table 2). At a Fe/Mo feed ratio of 2.79, about two-thirds of the uranium was precipitated, perhaps due to occlusion.

At near neutral pH, the molybdate removal is more efficient (Table 2) than at lower pH values. For example, at the same Fe/Mo feed ratio, the molybdenum in the solution is reduced from 114 ppm to 55 and 30 ppm at pH 7.2 and 6.6, respectively. As the pH decreases further, the uranium loss decreases, because the carbonate uranium complexes are converted to soluble UO$_2$$^{++}$. To illustrate this point, the pH of final solution was decreased by addition of extra ferric solution. The uranium concentration in the solution increased as the pH decreased in spite of increased ferric ion concentration (compare runs 13, 14 and 15 in Table 2). Of course, it can be seen that as the pH decreased, the amount of precipitate decreased and molybdenum removal could be impared.

It can also be seen that increased bicarbonate concentration in the leachate appeared to reduce uranium losses. Apparently, the increased bicarbonate concentration makes the uranium carbonate complex more stable and keeps it from occluding into the precipitate.

The uranium occluded in the precipitation could be recovered by washing with or without repulping using carbonates or dilute acid solutions. In Run 3, the filtercake was washed with 10 grams per liter of sodium bicarbonate solution. Analysis of the solution indicated that nearly all of the uranium had been recovered.

In another experiment, solutions of 10 percent of ammonium molybdate, with and without addition of about 400 ppm of silica, were prepared. The solutions were adjusted to pH of 7.4 and about 1000 ppm of ferric ion was added. Precipitate formed immediately in both solutions. However, in the solution with silica added, the precipitate settled at a rate about three times faster than that without silica addition. In addition, with silica, the precipitate was more compact and the volume of the precipitate was less than half of that without silica.

As can be seen from the above, it is evident that molybdenum in the leachate in uranium leaching processes can be removed with ferric ion, with little loss of uranium by controlling bicarbonate concentration and the pH of the solution. Furthermore, silica can also be removed from the process. The presence of silica modifies the precipitate and improves the rate of settlement. Any uranium lost during the precipitation may be recovered by washing the precipitate with dilute carbonate solution having a pH value of from about 5 to about 8. Additionally, when the molybdenum is present in sufficient amounts for economic recovery, the molybdenum in the precipitate can be recovered by leaching with a caustic solution having a pH of not less than 8.5.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

I claim:

1. A method for the recovery of uranium from a carbonate lixiviant which containes uranium and molybdenum values, wherein the carbonate lixiviant is characterized by having a pH of at least 4 and a carbonate concentration of at least 50 ppm by weight, comprising the steps of:
  (a) treating the lixiviant with an aqueous solution containing a sufficient amount of ferric ion to precipitate the molybdenum values without substantial precipitation of uranium values;
  (b) separating the precipitate from the lixiviant; and
  (c) passing the treated lixiviant through ion-exchange resin to cause the resin to retain uranium values.

2. The process of claim 1 further comprising the step of recovering uranium values from the resin.

3. The process of claim 1 wherein the carbonate lixiviant is characterized by having a pH value of at least 5.

4. The process of claim 1 wherein the carbonate lixiviant is characterized by having a carbonate concentration of at least 500 ppm by weight.

5. The process of claim 1 wherein the aqueous solution of ferric ion has a ferric ion concentration of at least 50 ppm by weight.

6. The process of claim 1 further comprising the step of treating the precipitate to recover traces of uranium values therein.

7. The process of claim 6 wherein a mild carbonate solution having a pH value of between about 5 to about 8 is utilized to treat the precipitate to recover uranium values therein.

8. The process of claim 6 further comprising subsequently treating the precipitate to recover molybdenum values therefrom.

9. The process of claim 8 wherein a caustic solution having a pH of at least 8.5 is utilized to recover the molybdenum values.

10. The process of claim 1 wherein the carbonate lixiviant which contains uranium and molybdenum values additionally contains silica contaminants.

11. A method for the recovery of uranium values from a lixiviant additionally containing other mineral values comprising the steps of:
  (a) treating the lixiviant to obtain a pH value of at least 4;
  (b) treating the lixiviant to obtain a carbonate concentration of at least 50 ppm by weight;
  (c) treating the lixiviant with an aqueous solution containing a sufficient amount of ferric iron to precipitate the other mineral values without substantial precipitation of uranium values;
  (d) separating the precipitate from the lixiviant; and
  (e) passing the lixiviant through ion exchange resin to cause the resin to retain uranium values.

12. The process of claim 11 further comprising the step of recovering uranium values from the resin.

13. The process of claim 11 wherein the lixiviant is treated to obtain a pH of at least 5.

14. The process of claim 11 wherein the lixiviant is treated to obtain a carbonate concentration of at least 500 parts per million by weight.

15. The process of claim 11 wherein the aqueous solution containing ferric iron has a ferric ion concentration of at least 50 ppm by weight.

16. The process of claim 11 further comprising the step of treating the precipitate to recover uranium values therein.

17. The process of claim 16 wherein the precipitate is treated with a mild carbonate solution having a pH value between about 5 and about 8.

18. The process of claim 16 further comprising the step of subsequently treating the precipitate to recover molybdenum values therefrom.

19. The process of claim 18 wherein a caustic solution having a pH of at least 8.5 is utilized to recover molybdenum values therein.

20. The process of claim 11 wherein the other mineral values consist of molybdenum values, silica, or any combination thereof.

21. A process for the in situ leaching of uranium values from a subterranean uranium-bearing formation, wherein the formation additionally contains other mineral values, comprising the steps of:
  (a) penetrating the formation by at least one injection well and at least one production well in communication with the injection well;
  (b) introducing into the formation an aqueous leaching solution containing an oxidant and a uranium complexing agent selected from the group consisting of carbonates, bicarbonates, carbon dioxide dissolved in water or any combination thereof;
  (c) allowing the leaching solution to traverse the formation to solubilize the uranium values therein;
  (d) producing pregnant leachate containing uranium and other mineral values;
  (e) treating the produced leachate to obtain a pH value of at least 5 and a carbonate concentration of at least 50 ppm by weight;
  (f) treating the leachate with an aqueous solution containing a sufficient amount of ferric iron to precipitate those other mineral values which form a precipitate when treated with ferric ion, without the substantial precipitation of uranium values;
  (g) separating the precipitate from the leachate; and
  (h) passing the treated leachate over an ion exchange resin to cause the resin to retain uranium values.

22. The process of claim 21 wherein the other mineral values comprise molybdenum values, silica, or any combination thereof.

* * * * *